United States Patent [19]

Kawanaka

[11] Patent Number: 5,666,476
[45] Date of Patent: Sep. 9, 1997

[54] THREE-DIMENSIONAL IMAGE DISPLAY DEVICE

[75] Inventor: Tatsuo Kawanaka, Tokyo, Japan

[73] Assignee: GE Yokogawa Medical Systems, Limited, Tokyo, Japan

[21] Appl. No.: 108,925

[22] Filed: Aug. 19, 1993

Related U.S. Application Data

[63] Continuation of Ser. No. 640,357, filed as PCT/JP89/00785, Jul. 29, 1989 published as WO90/01746, Feb. 22, 1990, abandoned.

[30] Foreign Application Priority Data

Jul. 29, 1988 [JP] Japan .................. 63-190132

[51] Int. Cl.$^6$ .................. G06F 15/00
[52] U.S. Cl. .................. 345/437; 345/439; 345/441; 345/523
[58] Field of Search .................. 395/127, 136, 395/137, 138, 139, 152, 141, 523

[56] References Cited

U.S. PATENT DOCUMENTS

| | | | |
|---|---|---|---|
| 4,653,012 | 3/1987 | Duffy et al. | 395/137 |
| 4,752,828 | 6/1988 | Chapuis et al. | 395/137 |
| 5,019,809 | 5/1991 | Chen | 340/815.31 |

FOREIGN PATENT DOCUMENTS 63-46575  2/1988  Japan .

*Primary Examiner*—Mark R. Powell
*Assistant Examiner*—Huynh Ba
*Attorney, Agent, or Firm*—Moonray Kojima

[57] ABSTRACT

A three-dimensional image display device comprising a main-image storage device for storing data representative of a main image; a sub-image storage device for storing data representative of a reduced image of the main image; coordinate input device for continuously entering a change in the viewing direction of an image; converting device for converting the output coordinate data of the coordinate input device into angle data representative of the image viewing direction; three-dimensional image calculating device for converting the main image data into three-dimensional image data on the basis of the angle data representative of the image viewing direction; changeover device for normally applying the sub-image data to the three-dimensional calculating device and for applying the main image data to the three-dimensional calculating device; control device for applying the angle data to the three-dimensional image calculating device and for controlling the changeover device; and image display device for displaying the main image and the sub-image on the same screen, whereby the view direction of the sub-image is changed until the desired direction is obtained, and then the main image in that desired direction is displayed. Advantageously, the invention enables selecting a view direction in real time by observing the view direction of the sub-image without the requirement of a dedicated hardware for such purpose.

1 Claim, 2 Drawing Sheets

THREE-DIMENSIONAL IMAGE DISPLAY DEVICE

This is a continuation of Ser. No. 07/640,357, filed as PCT/JP89/00785, Jul. 29, 1989 published as WO90/01746, Feb. 22, 1990, now abandoned.

TECHNICAL FIELD

This invention relates to a three-dimensional image display device for displaying a three-dimensional image of a body as viewed in any desired direction on the basis of image data representative of a body contour.

BACKGROUND ART

In three-dimensional image display devices, data representing a body contour (referred to as a surface model) in the form of three-dimensional position coordinates and normal vectors is stored in a storage unit, and using this data, an image of the body as viewed in any desired direction is displayed. Since the data stored in the storage unit is of the three-dimensional type, its volume when finely representing the body contour becomes large. Therefore, the quantity of calculation necessary in converting image data to obtain an image corresponding to any desired direction also becomes large. Conventionally, the direction in which the body is viewed is generally set by interactive control. In such an interactive control operation, numeric data representative of the direction is entered through an input unit such as a keyboard into a three-dimensional image display device. However, since the numeric data representative of the direction is less intuitive, it is very difficult for an operator to handle. To facilitate controlling, a realtime control system is also known. In such a system, a kind of hardware exclusive to conversion calculation is used to shorten the time of conversion calculation necessary to obtain an image as viewed in any desired direction, whereby the direction of a display image can be changed in realtime manner in linked relation to the operation of a coordinate input unit such as a track ball. However, such a device as including specific hardware is very expensive and poor in applicability.

DISCLOSURE OF THE INVENTION

It is an object of the present invention to provide a three-dimensional image display device which makes it possible in realtime manner to intuitively set the direction in which a body is viewed without the use of hardware exclusive to conversion calculation.

The present invention provides a three-dimensional image display device which comprises main-image surface model storage means for storing all data representative of a surface model, sub-image surface model storage means for storing data representative of a reduced image of the surface model, coordinate input means for continuously entering a change in the direction of an image, converting means for converting the output coordinate data of the coordinate input means into angle data representative of the image direction, three-dimensional image calculating means for performing the calculation of converting the surface model data into three-dimensional image data on the basis of the angle data representative of the image direction, changeover means for normally applying the sub-image surface model data to the three-dimensional image calculating means and on occasion applying the main-image surface model data to the three-dimensional image calculating means, control means for applying the angle data to the three-dimensional image calculating means and controlling the changeover means, and image displaying means for displaying a main image and a sub image on one screen.

BEST NODE FOR CARRYING OUT THE INVENTION

Figure 1:
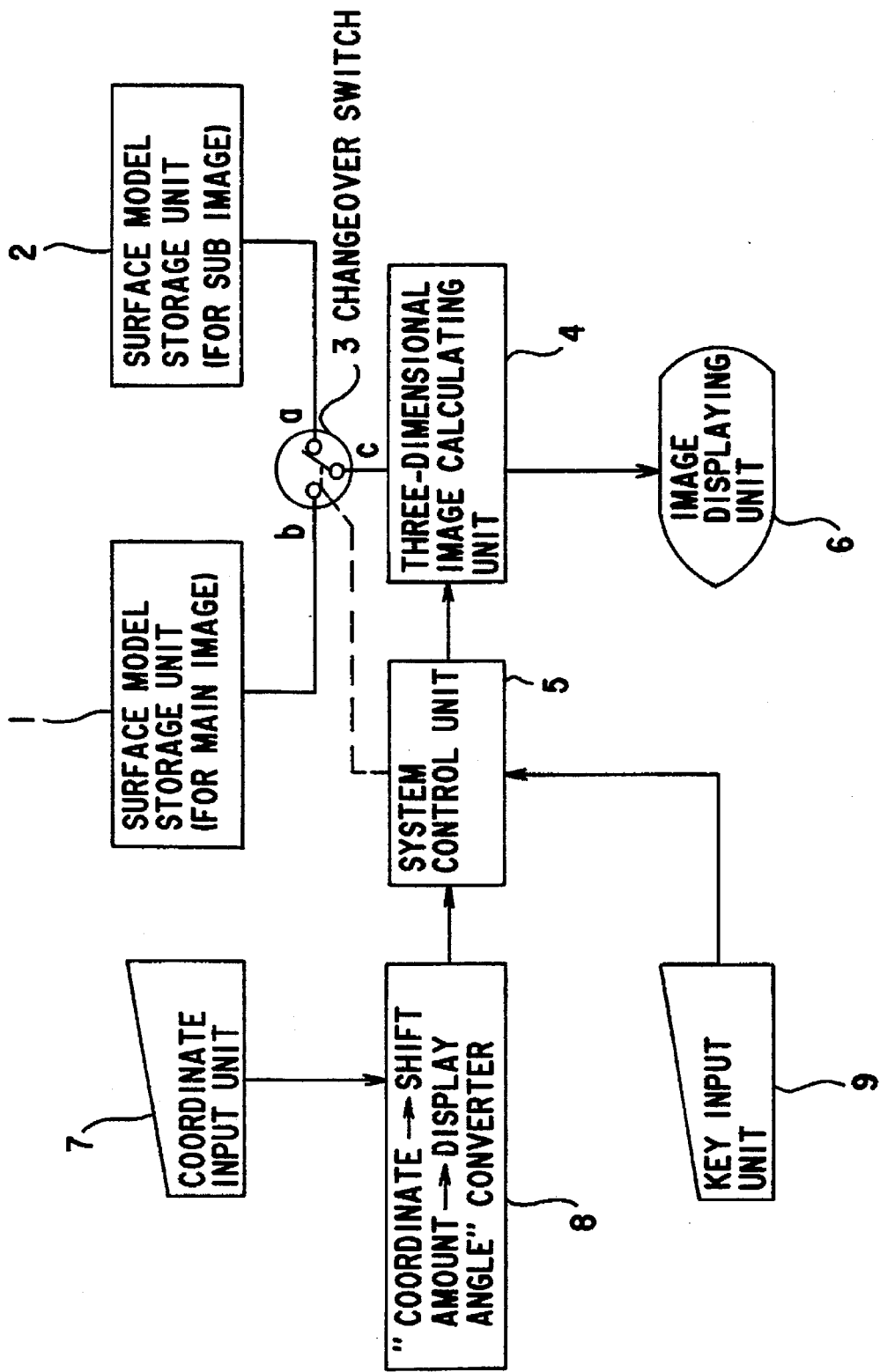
FIG. 1 is a block diagram of an embodiment of the present invention.
Figure 2:
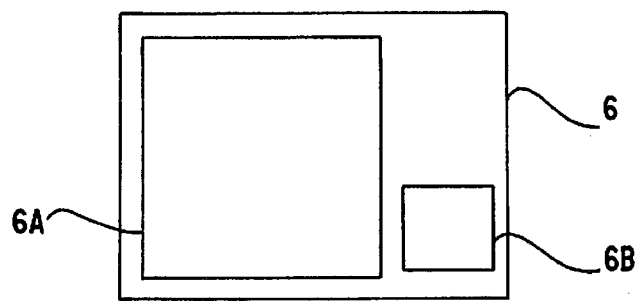
FIGS. 2 through 5 are diagrams explanatory of a display screen in the embodiment of the present invention.

In FIG. 1, 1 and 2 are surface model storage units for storing main-image data and sub-image data, respectively, of a surface model. The main-image data is all data representative of the surface model. The sub-image data is data representative of a sub image, i.e. a reduced image of the surface model, which is very small in the number of data components or very low in density as compared with the main-image data. 3 is a changeover switch for selecting the data of either surface model storage unit 1 or 2. The data selected by the changeover switch 3 is applied to a three-dimensional image calculating unit 4. The changeover switch 3 is controlled by a system control unit 5, whose movable arm $\underline{c}$ is normally held in contact with a contact $\underline{a}$, but on occasion is brought into contact with another contact $\underline{b}$. The three-dimensional image calculating unit 4 calculates, from the data applied through the changeover switch 3, a three-dimensional image whose direction conforms to a display direction specified by a control signal given from the system control unit 5, the calculated image being displayed by an image displaying unit 6. 7 is a coordinate input unit including, for example, a track ball, which is controlled by an operator to set the direction of an image to be displayed by the image displacing unit 6. A coordinate signal generated by the coordinate input unit 7 is applied to a display angle converter 8. The display angle converter 8 calculates the amount of shift from the applied coordinate data changing from time to time, converts into image direction data, and applies to the system control unit 5. The system control unit 5 controls the three-dimensional image calculating unit 4 in accordance with the applied data. 9 is a key input unit which is controlled by the operator to send a signal to the system control unit 5. All of the foregoing components are known in the art, such as those used to store T scanner data, to reconstruct the images obtained from the data, to give the image view direction, and to display the reconstructed image in a selected direction. The foregoing three-dimensional image display device can be embodied using a computer which is equipped with a storage unit and an operator-controlled input/output unit and programmed properly for such purposes.

Figure 3:
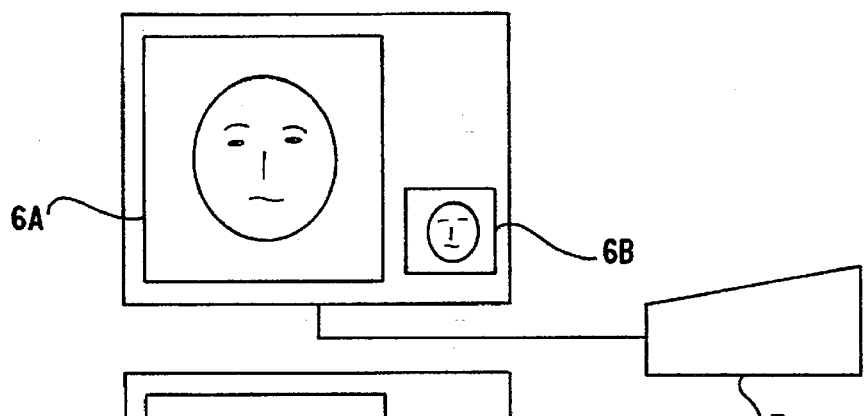

The operation of the foregoing device will be described with reference to FIGS. 2 through 5. In these drawings, components identical with those shown in FIG. 1 are designated by the same reference numerals. 6A is a main-image screen of the image displaying unit 6, 6B is a sub-image screen, and these screens display a main image and a sub image as illustrated in FIG. 3.

The sub-image data stored in the surface model storage unit 2 is applied through the changeover switch 3 to the three-dimensional image calculating unit 4 in which the data is converted into image data whose direction is in conformity with the control signal from the system control unit, the resulting data being displayed on the sub-image screen 6B of the image displaying unit 6. When the operator controls the key input unit 9 to cause the system control unit 5 to change over the changeover switch 3, the main-image data stored in the surface model storage unit 1 is applied to the three-dimensional image calculating unit 4 in which the data is converted into image data whose direction is in conformity with the control signal from the system control unit, the resulting data being displayed on the main-image screen 6A of the image displaying unit 6. When the control signal from the system control unit 5 specifies a frontal direction, the screens display a main image and a sub image as illustrated in FIG. 3.

Figure 4:
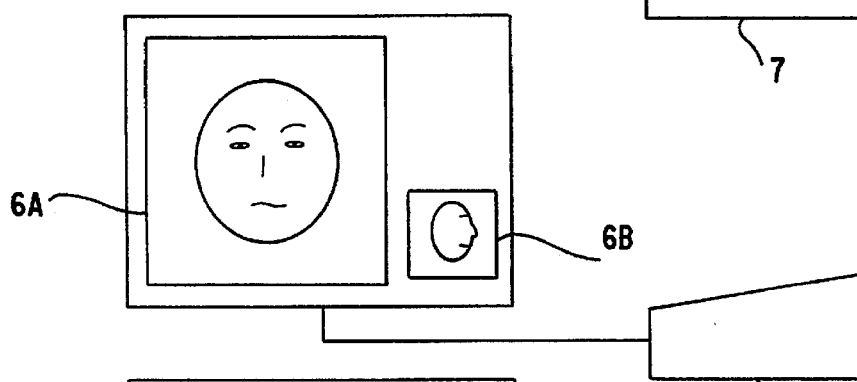
Figure 5:
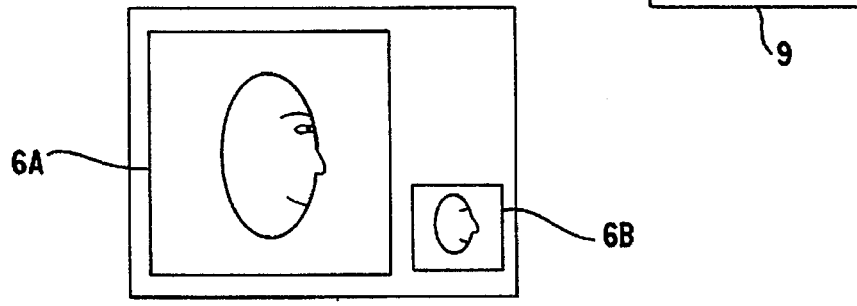

In the condition of FIG. 5, when the operator turns the track ball or the like of the coordinate input unit 7 in a desired direction, the coordinate data to be applied to the display angle converter 8 is changed. The display angle converter 8 converts the applied input signal into display angle data and applies to the system control unit 5. The system control unit 5 applies the control signal based on the display angle data to the three-dimensional image calculating unit 4. The three-dimensional image calculating unit 4 performs calculation on the sub-image data of the surface model storage unit 2 in accordance with the current control signal, the resulting image data being displayed on the sub-image screen 6B of the image displaying unit 6. The foregoing calculation and displaying of the sub image are performed repeatedly while the track ball or the like of the coordinate input unit 7 is turning. Since the sub-image data of the surface model storage unit 2 is very small in the number of data components as compared with the main-image data of the surface model storage unit 1, the calculation and displaying of the sub image can be performed in realtime manner. Therefore, the sub image displayed on the sub-image screen 6B changes its direction in linked relation to the turning of the track ball or the like. By observing the displayed sub image, the operator can confirm how the image is seen after its display direction is changed. After confirming the direction of the sub image as illustrated in FIG. 4, for example, the operator controls the key input unit 9 to cause the system control unit 5 to change over the changeover switch 3. As a result, the main-image data stored in the surface model storage unit 1 is applied to the three-dimensional image calculating unit 4 in which the data is converted into image data whose direction is in conformity with the control signal from the system control unit, the resulting data being displayed on the main-image screen 6A of the image displaying unit 6. In this way, the main image is converted as to have the same direction as that of the sub image and displayed with a desired direction, as illustrated in FIG. 5. Although the changeover switch 3 is changed over by controlling the key input unit 9, it may be changed over by the determination of the system control unit 5 that is issued if the coordinate data from the coordinate input unit 7 remains unchanged for a given interval of time, i.e. if the operator does not change the display direction of an image for a given interval of time or more.

In this way, the direction of only the sub image whose number of image data components is small is changed in realtime manner, and when it is confirmed that the image as viewed has a desired direction, the direction of the main image is changed at once, whereby the main image having a desired direction can be readily obtained.

The present invention should not be limited to the foregoing embodiment. Where the body to be displayed has no distinct direction as is the case of a tumor or internal organs, the body on which the main image is based is not used as the base of the sub image, but a different body (such as a bone) which occupies the same position and whose direction can be readily perceived is used as the base of the sub image, whereby the direction of the sub image can be readily determined. In this case, image data of, for example, a bone is previously stored in the surface model storage unit 2. The coordinate input unit 7 may be of any type which can enter position information continuously, such as a mouse or joystick.

What is claimed is:

1. A three dimensional image display device comprising:

first storage means for storing data of a main image;

second storage means for storing data of a sub-image representative of said main image, said sub-image being smaller in a display means than said main image and the data of said main image being substantially greater than the data of said sub-image;

view direction means for supplying data representing different view directions to a control means;

calculating means for calculating output display signals in the different view directions from data of said main image and from data of said sub-image, and for applying said output display signals of said main image and of said sub-image to said display means;

said display means for displaying in the different view directions said sub-image and said main image;

switching means for selectively connecting said first storage means and said second storage means to said calculating means; and said control means comprising means for causing said switching means to connect said second storage means to said calculating means to cause said calculating means to perform calculations on the output data from said second storage means and to apply that calculated output data to said display means thereby to cause said sub-image to be displayed on said display means, means responsive to said view direction means for causing the view direction of said sub-image in said display means to be changed in real time until a desired view direction of the sub-image appears in the display means, and means under the control of an operator for causing said switching means to connect said-first storage means to said calculating means when the sub-image is displayed in a desired view direction in the display means so that said calculating means performs calculation on the output data of said main image from said first storage means in the desired view direction and applies that calculated output data of said main image to said display means thereby to cause said main image to be displayed in said display means in the desired view direction, so that by first observing a smaller sub-image in the display means in different view directions in real time, a desired view direction is selected and then the main image data is calculated in non-real time for the desired view direction and then displayed in the display means without the use of hardware dedicated for the for the purpose of conversion calculations.

* * * * *